US008051049B2

(12) United States Patent
Remington et al.

(10) Patent No.: US 8,051,049 B2
(45) Date of Patent: Nov. 1, 2011

(54) METHOD AND SYSTEM FOR PROVIDING ENHANCED MATCHING FROM CUSTOMER DRIVEN QUERIES

(75) Inventors: Rich Remington, Easton, PA (US); Pam Malene, Mechanicsburg, PA (US); Mia Morgan, Macungie, PA (US); Linda Rose, Mountainside, NJ (US); Sandy Stoker, Allentown, PA (US); Dan Wadding, Saylorsburg, PA (US); Jeff Brill, Schnecksville, PA (US); Richard Flynn, Phillipsburg, NJ (US); Art Husk, Washington, NJ (US); Marie Panas, Elmhurst, NY (US); Larry Skahill, Bath, PA (US); Sean Carolon, Walnutport, PA (US)

(73) Assignee: The Dun & Bradstreet Corporation, Short Hills, NJ (US)

( * ) Notice: Subject to any disclaimer, the term of this patent is extended or adjusted under 35 U.S.C. 154(b) by 114 days.

(21) Appl. No.: 11/646,227

(22) Filed: Dec. 27, 2006

(65) Prior Publication Data
US 2007/0265995 A1 Nov. 15, 2007

Related U.S. Application Data

(60) Provisional application No. 60/754,139, filed on Dec. 27, 2005.

(51) Int. Cl.
*G06F 17/30* (2006.01)
(52) U.S. Cl. ............................ 707/692; 707/694; 706/12
(58) Field of Classification Search .............. 707/1, 692, 707/694; 706/12
See application file for complete search history.

(56) References Cited

U.S. PATENT DOCUMENTS

| | | | |
|---|---|---|---|
| 5,576,755 A * | 11/1996 | Davis et al. ...................... 725/48 |
| 2002/0032665 A1* | 3/2002 | Creighton et al. .............. 705/76 |
| 2002/0055924 A1* | 5/2002 | Liming .......................... 707/100 |
| 2002/0133721 A1* | 9/2002 | Adjaoute ....................... 713/201 |
| 2004/0133501 A1 | 7/2004 | Parry et al. ....................... 705/37 |
| 2004/0220918 A1 | 11/2004 | Scriffignano et al. .............. 707/3 |
| 2004/0225543 A1 | 11/2004 | Kapochunas et al. ............. 705/7 |
| 2004/0243539 A1 | 12/2004 | Skurtovich, Jr. et al. ......... 707/1 |
| 2005/0010551 A1* | 1/2005 | McGeachie et al. ............. 707/1 |
| 2005/0154664 A1* | 7/2005 | Guy et al. ....................... 705/35 |

* cited by examiner

*Primary Examiner* — James Trujillo
*Assistant Examiner* — William Spieler
(74) *Attorney, Agent, or Firm* — Ohlandt, Greeley, Ruggiero & Perle, LLP

(57) ABSTRACT

A system for providing enhanced matching for database queries. The system includes a data source; a data repository comprising a single-sourced reference file; a database comprising a multi-sourced reference file, the multi-sourced reference file having a first unique business identification number corresponding to a business entity; and an intelligence engine processing incoming data from the data source. The intelligence engine determines whether the incoming data matches the multi-sourced reference file and adds the data to the multi-sourced reference file when the data matches the multi-sourced reference file. The intelligence engine also determines whether the incoming data matches a single-sourced reference file contained within the data repository when the data does not match the multi-sourced reference file.

9 Claims, 7 Drawing Sheets

1. Trade, Public Records (Suits, Liens, Judgements, Business Registrations UCC), Yellow pages
2. NextGen Reference file containing Multi-sourced D-U-N-S Numbered records
3. NextGen Reference file containing Single Sourced D-U-N-S numbered Records
4. Traditional D-U-N-S Number Repository (AOS) will be updated via DDR.
5. Update the record in DDR and await multi-sourcing

Integration - Drivers of Value

| | Example | Current Situation | How IE would add value |
|---|---|---|---|
| The data is same as what we have | The address on a single source record is corroborated by a second source | • 1 - 1.5 MM validation decisions are made annually in the UDR<br>• 9.3 MM maintenance calls are made annually | • Generate multi-sourced D-U-N-S numbers through optimal validation of single source data<br>• Use automated validation to ensure more selective outbound calling<br>• Increase overall accuracy of our data based on multiple validations and their frequencies stored in the AOS. |
| The data is different from what we have | A different address on an existing (single source) record is obtained from a new suits file | • 1 - 1.5 MM tie-breaking decisions are required on the UDR on an yearly basis<br>• 2 - 4 MM similar decisions are made on the AOS<br>• Incorrect addresses contribute to walkaways | • Create judgmental tie breaking rules to consolidate disparate pieces of information<br>• Capture the most updated and accurate information (on say, address) available at any time |
| We did not have this data (although we had the entity) | A D-U-N-S number which did not have a phone receives a phone number with a piece of trade | • More than 60 MM trades are processed by us each year.<br>• Using this for adding data other than trade would enhance record timeliness<br>• Integration would improve fill rate of single source integrated records by 3 % annually | • Capture relevant information from all possible sources to store the most complete information available at any time |

Data on entity existing within D&B

Data on entity new to D&B — D-U-N-S Number is either pre-assigned or assigned in "real time"

Regular data feed

☐ Areas where the Intelligence Engine can add value

Fig. 1

1. Trade, Public Records (Suits, Liens, Judgements, Business Registrations UCC), Yellow pages
2. NextGen Reference file containing Multi-sourced D-U-N-S Numbered records
3. NextGen Reference file containing Single Sourced D-U-N-S numbered Records
4. Traditional D-U-N-S Number Repository (AOS) will be updated via DDR.
5. Update the record in DDR and await multi-sourcing 1. NextGen Reference file containing Multi-sourced D-U-N-S Numbered records
2. NextGen Reference file containing Single Sourced D-U-N-S numbered Records
3. Existing product
4. Existing/New products (TBD); New fabrication
5. Update record in DDR and await multi-sourcing
6. No match found in non-D&B business and consumer data sources.

Notes

1. After the one-time clean up and migration of access systems, UDR can be sunset.
2. The flow of the business updates is reversed and the global system will now feed the local system. (DDR to AOS)

METHOD AND SYSTEM FOR PROVIDING ENHANCED MATCHING FROM CUSTOMER DRIVEN QUERIES

CROSS REFERENCE TO RELATED APPLICATIONS

This application claims priority to U.S. Provisional Application No. 60/754,139 filed Dec. 27, 2005, the content of which is herein incorporated by reference.

BACKGROUND

1. Field

The present disclosure relates to searching and matching data, and more particularly, to searching and matching data to provide answers to business queries.

2. Description of Related Art

Previously, customers of a business data service frequently requested information about entities. Even though the requested information was resident in the internal data repositories of the business data service, a meaningful answer could not be provided to the requester. There are two primary reasons for this. First, the record resides in an internal repository, but is not readily available to customers because it lacks a business identifier or D-U-N-S Number®. Second, the record has a business identifier, but the "individual" data view and the historical data view are not in a match reference file of the business data service.

According to a recent survey, 62% of the respondents indicated that the ability to search for records on companies that have not yet qualified for an entity identifier would improve their experience. The ability to utilize all internal data to provide an insightful answer to customer inquiries without significantly changing customer behavior or processes, product delivery and system response time is needed.

There is a need for a system and method that provides a meaningful answer to an information query at a much higher rate than in the prior art.

SUMMARY

The method and system described in this disclosure provides a meaningful answer substantially 100% of the time to customer queries for information records concerning particular entities.

A method for enhanced matching of database queries is provided. The method includes receiving data from a data source, determining whether the data matches a multi-sourced reference file comprising a first unique business identification number, the multi-sourced reference file being contained within a database, adding the data to the multi-sourced reference file when the data matches the multi-sourced reference file, and determining whether the data matches a single-sourced reference file contained within a data repository when the data does not match the multi-sourced reference file.

A system for providing enhanced matching for database queries is also provided. The system includes a data source; a data repository comprising a single-sourced reference file; a database comprising a multi-sourced reference file, the multi-sourced reference file having a first unique business identification number corresponding to a business entity; and an intelligence engine processing incoming data from the data source. The intelligence engine determines whether the incoming data matches the multi-sourced reference file and adds the data to the multi-sourced reference file when the data matches the multi-sourced reference file. The intelligence engine also determines whether the incoming data matches a single-sourced reference file contained within the data repository when the data does not match the multi-sourced reference file.

BRIEF DESCRIPTION OF THE DRAWINGS

Other and further objects, advantages and features of the present disclosure will be understood by reference to the following specification in conjunction with the accompanying drawings:

FIG. 1 depicts areas in which the system of the present disclosure can add value;

DESCRIPTION OF THE PREFERRED EMBODIMENT

Figure 2:
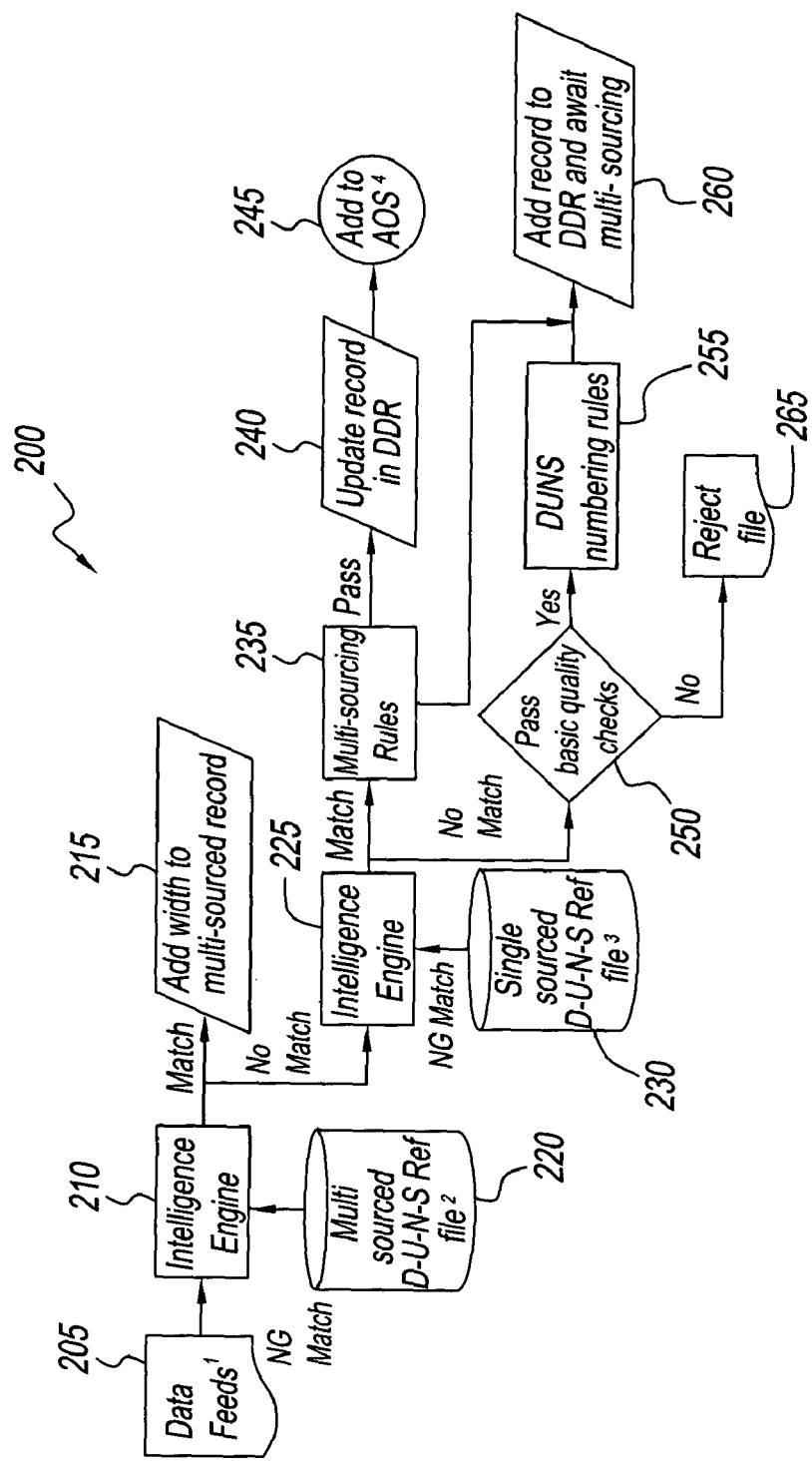
FIG. 2 depicts an unmatched data flow of the system of the present disclosure.

The 100% resolution process of the present disclosure provides an insightful answer substantially 100% of the time that customers ask a question and collects revenue for returning that answer. The 100% resolution process focuses on the following six key initiatives:

Initiative 1: Leveraging all internal data repositories
Initiative 2: Using external business data sources
Initiative 3: Using consumer data sources
Initiative 4: Improving matching
Initiative 5: Improving product availability
Initiative 6: Eliminating customer walk-aways Previously, customers frequently requested information about entities residing in the internal data repositories, yet information providers were not able to provide any answer for two main reasons: (1) The record resided in an internal repository but was not readily available to customers because it lacked a unique business identification number, such as a D-U-N-S® number. This is resolved through the efforts of Initiative 1. (2) The record was D-U-N-S numbered but the "individual" data view and the historical data view were not in the information provider's match reference file. This is resolved through the efforts of Initiative 4.

According to a recent survey, 62% of the respondents indicated that the ability to search for records on companies that have not yet qualified for a D-U-N-S number would improve their experience. The ability to utilize all internal data to provide an insightful answer to our customer inquiries without significantly changing customer behavior or processes, product delivery and system response time is the backbone of the 100% resolution process of the present disclosure.

To efficiently provide business insight to customers, it is critical to develop a strategy around providing a key to track and organize the vast amounts of non D-U-N-S numbered data.

The system of the present disclosure pre-assigns a D-U-N-S number to non-D-U-N-S numbered data as it flows into a database, so it is available when a customer makes an inquiry, utilizing "real time" D-U-N-S number assignment only for non external data sources.

The system necessitates changes to the current D-U-N-S number allocation process. The prior policy does not provide the ability, in the long term, to make available the amount of D-U-N-S numbers required for this initiative. Thus, the system initially uses a short-term strategy to ensure that we have an adequate supply of D-U-N-S numbers in the near future and a long-term strategy that includes modification to the algorithm by which D-U-N-S numbers are generated.

Previously, the majority of the data that did not match to the D-U-N-S numbered universe was stored in a repository known as the UDR or Unmatched Data Repository. The present disclosure has determined that current non-D-U-N-S numbered repositories contain high quality business data which can be used to effectively answer customer inquiries. Fulfilling customer's requests with an insightful answer requires that we make full use of all internal data, including that which was previously not D-U-N-S numbered.

In a first step, the system pre-assigns a D-U-N-S Number to all in-house unmatched data entities meeting minimum data requirements and stores these in the same repository as the traditional or multi-sourced D-U-N-S numbered universe, DUNSRight™ Data Repository with the appropriate indicators. Since this database feeds a match reference file(s), this quickly expands the amount of data available to answer customer's inquiries.

Following the initial D-U-N-S number pre-assignment process, the system creates an environment that allows customers to:
  match inquiries against all stored D-U-N-S numbered data;
  cluster like data entities; and
  create an integrated D-U-N-S numbered record that can be delivered as an insightful answer;
and enables information providers to:
  continuously match all internal data feeds/sources against all stored D-U-N-S numbered data and across the incoming data to reduce the creation of duplicates;
  cluster like data entities and integrate to create new multi-sourced D-U-N-S numbered records that can be delivered to customers; or
  identify and D-U-N-S number new unique single source records that can be delivered to customers upon inquiry.

In the event that a customer's inquiry is not answered using internal data repositories, this environment must support "real time" D-U-N-S number assignment, storage and product fabrication.

Initiative 4:

We also know that we can improve our match rates by at least 2 percentage points by matching incoming data against the D-U-N-S numbered Executive at Home Address file and the D-U-N-S Decision Maker file. The addition of these records to the match reference file as well as historical firmagraphic information further enhances our ability to provide an insightful answer to customers.

The five major functional areas addressed by Initiatives 1 and 4 are as follows:

1. The Intelligence Engine is based on a streamlined data integration process that incorporates business defined rules to provide an automated data flow to match, cluster and integrate all incoming data to ensure reduction of the lag time between data coming into the database and being available to answer customer's questions. This allows fine tuning of the rules to continuously improve our matching and integration processes to reduce latency and improve validations over time. It will also report statistics for volumes of records, successful matches, data presence and exception reporting to provide input for the fine tuning process.

2. The D-U-N-S Number assignment engine assigns D-U-N-S Numbers to new unmatched data entities received from customer inquiries, traditional data sources (Trade and Public Records), new Telco database (Business Yellow & White Pages) and non-traditional sources (consumer, securities crosswalk) based on minimum data requirements and business defined rules. This assignment engine must support all customer inquiries being answered with a D-U-N-S numbered product via "real time" product fabrication.

3. The data management process is based on a newly defined and much larger D-U-N-S numbered universe that includes a more efficient database design, a more streamlined data flow and an infrastructure strategy that has an increased processing capacity and flexible monitoring capabilities. This accounts for an increase in duplicate record and error processing; the storage of a new class of information (metadata) in the global data repository that will provide intelligence around our data; and the appropriate handling of linked entities. This new level of information is helpful for reengineering our data maintenance processes to support the expanded universe of records to be managed.

4. Customer input is leveraged with more and/or better match points to increase the probability that a matching system identifies a high-quality match. This incorporates alternative data views, leveraging the data used to create the EHA (Executive at Home Address) and DDM (D-U-N-S Decision Maker) files; and historical data into the match process as well as the appropriate system changes to handle increased match throughput.

5. The system allows customer buying behavior statistics to drive reengineering efforts to focus data maintenance strategy that increases customer buy rate by ensuring we have quality records in the file, with current addresses to answer customer's questions. We will leverage customer buying behavior earnings to improve quality and to support file expansion. In addition, the plan must recognize and account for gaps in the current strategy by designing the appropriate processes to ensure that all high potential inquiry records receive a minimum level of maintenance.

The system provides a major transformation in the way D-U-N-S numbers are allocated, assigned and ultimately defined, thereby expanding the use of D-U-N-S numbers beyond the prior approach. Customers want D-U-N-S numbers on all answers we provide.

The system makes the vast amounts of what previously were non-D-U-N-S numbered records available to our customers. The non-D-U-N-S numbered data was comprised of new data that has not been corroborated by other data from a second unique data source and new data that is multi-sourced but has not been assigned a D-U-N-S number. The majority of this data was stored within the UDR.

The system provides an initial data load of single source D-U-N-S numbers that are uniquely identifiable and stored in an accessible environment called the DUNSRight Data Repository. The system performs the following steps:

Step 1: Match all the UDR records to our US D-U-N-S numbered database (AOS) via a matching process.

Step 2: Identify all records with a confidence code of 8+ as a multi-sourced record and do not include in the initial data load.

Step 3: Identify and file build, of the remaining records, those that have two separate unique data sources and pass ARDA rules for D-U-N-S Number assignment.

Step 4: Those remaining records which meet the minimum data requirements for D-U-N-S number pre-assignment and pass all rules and validations are used by the system as the initial load file of single source D-U-N-S numbered records. Step 5: The UDR, related process flows and products are de-commissioned once the system of the present disclosure is deployed.

The Intelligence Engine realizes this functionality by automatically adding data depth where appropriate, using rules to decide between conflicting pieces of information to integrate and store the most accurate information; and identifying areas where data maintenance calls of the D-U-N-S numbered universe may be reduced and maximizing those calls that are made.

The Intelligence Engine identifies and consolidates disparate business information, by extending the scope of a matching process' superior match capabilities to cluster and integrate similar entities to generate a high-quality and representative composite entity.

The Intelligence Engine:
Increases depth of data—by adding demographic/firmagraphic information (for example, adding phone numbers from the Telco database),
One time increase in the breadth of data by integrating similar data entities into one composite entity from the UDR,
Increase overall quality of our information—through designing rules to capture the most accurate, complete and timely information, and
Reduce volume of maintenance calls for records that can be validated automatically leading to focused outbound calling and a more automated update process To this end, the Intelligence Engine:
is portable (i.e. usable to accept and integrate other data sources),
retains pointers to the individual components of a composite record,
functions in both "real time" and pre-assign D-U-N-S numbering environments,
accommodates on a daily basis the same response time and daily volume in the online environment today, and
accommodates an increase of 2 times in the 12 months and 3 times in the 24 months following implementation.

The system uses a comprehensive policy to address instances of conflicting information. This is accomplished with a set of judgmental tie-breaking rules detailing which piece of information to keep from which data source.

Referring to FIG. 1, the Intelligence Engine adds value by creating new records through consolidation of disparate pieces of information and increasing the overall quality of our data by improving elements of accuracy, completeness and timeliness. A single source record is a record with either a pre-assigned D-U-N-S or an assigned D-U-N-S number where the basic identification information has not been corroborated by a second unique data source.

In addition to the Intelligence Engine, the system also comprises a D-U-N-S number assignment engine that pre-assigns a D-U-N-S number for data new to the database from regular data feeds, or "real time" assigns a D-U-N-S number (a single source D-U-N-S number) for data new to the database from only one customer; one or more database repositories (DDR) to store the aforementioned single source D-U-N-S numbers and corresponding metadata; and "real time" product fabrication.

The system:
1. Uses a process for D-U-N-S number pre-assignment and "real time" D-U-N-S number assignment that is supported by "real time" product fabrication for online and batch systems.
2. Uses a repository (DDR) with the appropriate data management processes and a process flow to reclassify a single source D-U-N-S number record to a multi-sourced record, when appropriate, and push that information through to all suitable locations.
3. Real time edits and validations using at least the same level of validation that is applied today prior to D-U-N-S number assignment. This includes a dirty word table; address standardization and validation; spell check; and automated duplicate report protection (DRPS)/error processing to mitigate erroneous or duplicate data from entering the database. The system also uses a process to determine linkage (parent, subsidiary, branch and headquarter relationships). All records will be processed for SIC assignment and leverage all existing red flag, high risk alerts and Fraud modules in real time. To avoid the inappropriate assignment of a D-U-N-S numbered record based on erroneous data entry, the system uses software that flags entries of invalid city and state combination; invalid area code exchange, etc. and corrects where possible. Preferably, interactive edits are used to prompt the customer to re-enter the data for entries of invalid city and state combination; invalid area code exchange, etc.
4. Uniquely identifies all single source records that have been reclassified as a multi-sourced record since they may call for a different manner of data maintenance due to their emerging business status and to avoid unnecessarily taking the record to an inactive status. The system also retains all source data information (metadata) at the record and data element level to avoid incorrect multi-sourcing of single source records. The system will provide the ability to disallow single sourced records to flow into other systems (except for online and batch matching) until they are multi-sourced. The system also comprises a user-interface that allows for data analysis and look-up as well as a standard database audit system that is user-defined and modifiable.
5. Receives all online and batch customer transactions.
6. Expands the online and batch matching service to access all internal data including single source data to return the record with the highest confidence code to the customer. If the returned record had been a single source record then that D-U-N-S Number is classified as a multi-sourced record and be made available to all customers.
7. Extends the online and batch match service to match customer inquiries that are not found in the internal data to external structured data sources to enable the assignment and product fabrication/delivery of a D-U-N-S number in real time, if a high quality match is found. The new D-U-N-S Number is stored as a single source record and is not made available to others until the record is reclassified as a multi-sourced record by corroboration of the data by a unique second data source.
8. Uses External data sources that comprise a structured or unstructured data.
9. Uses an online access system that is able to fabricate products.
10. Assures that all D-U-N-S numbers assigned and stored as a single source record have an "assign date". This date is used to monitor the amount of time it takes to be classified as a multi-sourced D-U-N-S numbered record.

The system also uses rules regarding the age of single source records D-U-N-S Numbers and a retention rule as to how long the record is stored before recycling the single source D-U-N-S number. For example, if a record is pre-assigned a D-U-N-S number from a business registration and has not been reclassified as a multi-sourced record after a predetermined time, then the D-U-N-S number would be made available for re-issue to a new record. If the single source D-U-N-S number was assigned based on customer input, the D-U-N-S number is not recycled.

The system provides flexible processing and storage capacity; and monitoring capabilities with business-defined audit and reporting methods.

The system performs the following activities:
1. Tracks by data element source, subscriber and uses database archiving and/or D-U-N-S number recycling process for single source records.
2. Uses NCOA (National Change of Address) processing to all US records and leverages the Intelligence Engine to integrate in the data changes in an automated process flow.
3. Resolves all records that are excluded by the current file build process by incorporating the following process improvements in file build calling—SETS, Look-Alikes, Professionals and unresolved SIC assignment and uses learnings to enhance the IE.
4. Uses a record update process that uses data element change including negative resolution as "triggers" to ensure the most accurate information is reflected in the database.
5. Utilizes the unique indicator for all single source records that have been reclassified as a multi-sourced record to apply a different manner of data maintenance due to their emerging business status and to avoid unnecessarily taking the record to an inactive status.
6. Uses monitoring capabilities and related audit reports, including, but not limited to:
   Monitoring the universe of remaining US D-U-N-S numbers and provide audit reports on a daily, weekly and monthly basis.
   Monitoring the number of single source D-U-N-S numbers that are reclassified as a multisourced D-U-N-S number "multi-sourcing" by source, subscriber number, etc and provide audit reports on a daily, weekly and monthly basis.
   Monitoring the number of single source D-U-N-S numbers assigned by source, subscriber #, etc. and provide audit reports on a daily, weekly and monthly basis.
   Monitoring the number of single source D-U-N-S numbers that are recycled by source, subscriber, etc. and provide audit reports on a daily, weekly and monthly basis.
   Providing alert notifications when thresholds are exceeded to appropriate business owners.

In order to protect the integrity of the database, the system identifies and utilizes the appropriate business rules that define valid customer input (e.g.—customer must be identifiable via a valid subscriber number) and employs upfront and on the back end the appropriate high risk alert and fraud detection services. The system incorporates data security mechanisms to protect against spoofing, denial of service and unauthorized intrusions.

The system provides the foundation that simultaneously feeds our global D-U-N-S numbered universe with multi-sourced records and allows for "real time" delivery of D-U-N-S numbered product from a repository other than our traditional D-U-N-S numbered repositories. This system:
   Cleans-up UDR by clustering, integrating and de-duping the records via an Intelligence Engine,
   Pre-assigns D-U-N-S numbers to the cleansed single source UDR records using a D-U-N-S assignment engine,
   Loads these single sourced D-U-N-S numbered records into a Data Repository Environment,
   Uses a matching engine to access the single sourced records for both online and batch,
   Provides answers by fabricating products based on the single sourced records,
   Provides matches via an online service, and
   Employs a matching logic that operates with EHA, DDM and historic address files.

Referring to FIG. 2, a method 200 of enhancing matching of database queries is shown. Method 200 is a method for matching data to a database 220 of multi-sourced reference files as well as to a data repository 230 of single-sourced reference files. Method 200 includes the step of receiving data from a data source 205. Data from data source 205 is then fed into an intelligence engine, which performs a first matching step 210. At first matching step 210, the intelligence engine determines whether the data correlates or matches to a first record of a plurality of records in one or more multi-sourced reference files in database 220. The first record includes a unique business identification number, such as a D-U-N-S number, indicating that the first record correlates to a business entity described by the first record. The first record also includes a source identifier indicating that the first record comprises data from two or more independent data sources, that is, that the first record is multi-sourced.

If the intelligence engine determines at first matching step 210 that the data matches the first record, method 200 performs a combination step 215, by combining the data and the first record to generate a combined record when said data field is not found in said first record. Combination step 215 stores the combined record in one or more of the selected internal reference files having the unique business identification numbers. The combined record also includes a source identifier indicating that the combined record comprises data from two or more data sources. In one embodiment, method 200 deletes the first record after combining the data and the first record to generate the combined record.

If the intelligence engine determines that the data does not match the first record, method 200 performs a second matching step 225. At second matching step 225, the intelligence engine determines whether the data correlates or matches to a second record of a plurality of records in one or more single-sourced reference files in data repository 230. The second record includes a unique business identification number, such as a D-U-N-S number, indicating that the second record correlates to a business entity described by the second record. The second record also includes a source identifier indicating that the second record comprises data from only one data source, that is, that the second record is single-sourced.

If the intelligence engine determines that the data does not match the second record, method 200 then performs quality checking step 250, performing basic quality checks on the data to verify that the data meets predetermined standards for inclusion in data repository 230. If the data fails to meet the basic quality standards at quality checking step 250, method 200 then sends the data to a reject file 265. However, if the data meets the basic quality standards at quality checking step 250, method 200 then performs an assigning step 255. At assigning step 255, the data is assigned a second unique business identifier, such as a D-U-N-S number, corresponding to a second business entity that was not previously present in the files of database 220 or data repository 230. Method 200 then performs a storing step 260 wherein the data, having been assigned the second unique business identifier, is added to data respository 230.

If the intelligence engine determines that the data matches the second record, method 200 performs a multi-sourcing determination step 235. Multi-sourcing step 235 determines whether the data qualifies as a verifying data source to enable a single-sourced reference file to be reclassified as a multi-sourced reference file. Multi-sourcing step 235 makes this determination based on predefined rules resident in the intelligence engine. If, according to the predefined rules, the intelligence engine determines that the data qualifies as a verifying data source, method 200 performs an updating step 240, wherein the second record is reclassified from a single-sourced reference to a multi-sourced reference and in step 245 is added to database 220. In one embodiment, the second record is removed from data repository 230.

The intelligence engine is used to integrate information and remove duplicate information between regular data feeds to the single-sourced data repository and the multi-sourced database. The incoming data feeds are processed through the intelligence engine.

If a match is found between regular data feeds and traditional D-U-N-S number repository (AOS), the Intelligence Engine adds width to the existing multi-sourced record in AOS.

If a match is NOT found in AOS but found with the single sourced records (non-traditional D-U-N-S), the intelligence Engine enhances the record and passes it through multi-sourcing rules (since the second record would serve to multi-source) to upload to AOS. The record is tagged in DDR to be updated as multi-sourced. If the record fails the multi-sourcing rules, the record is left in the DDR for future multi-sourcing.

If the data does not match to either the multi-sourced or single sourced records, a check is performed to determine whether the data passes basic D-U-N-S numbering criteria. If the data passes basic D-U-N-S numbering criteria, the data is assigned a D-U-N-S number and added as a record to the DDR, the record having a single sourced D-U-N-S number with the appropriate indicators. If the data does not satisfy basic D-U-N-S numbering criteria, it is sent to the reject file.

Figure 3:
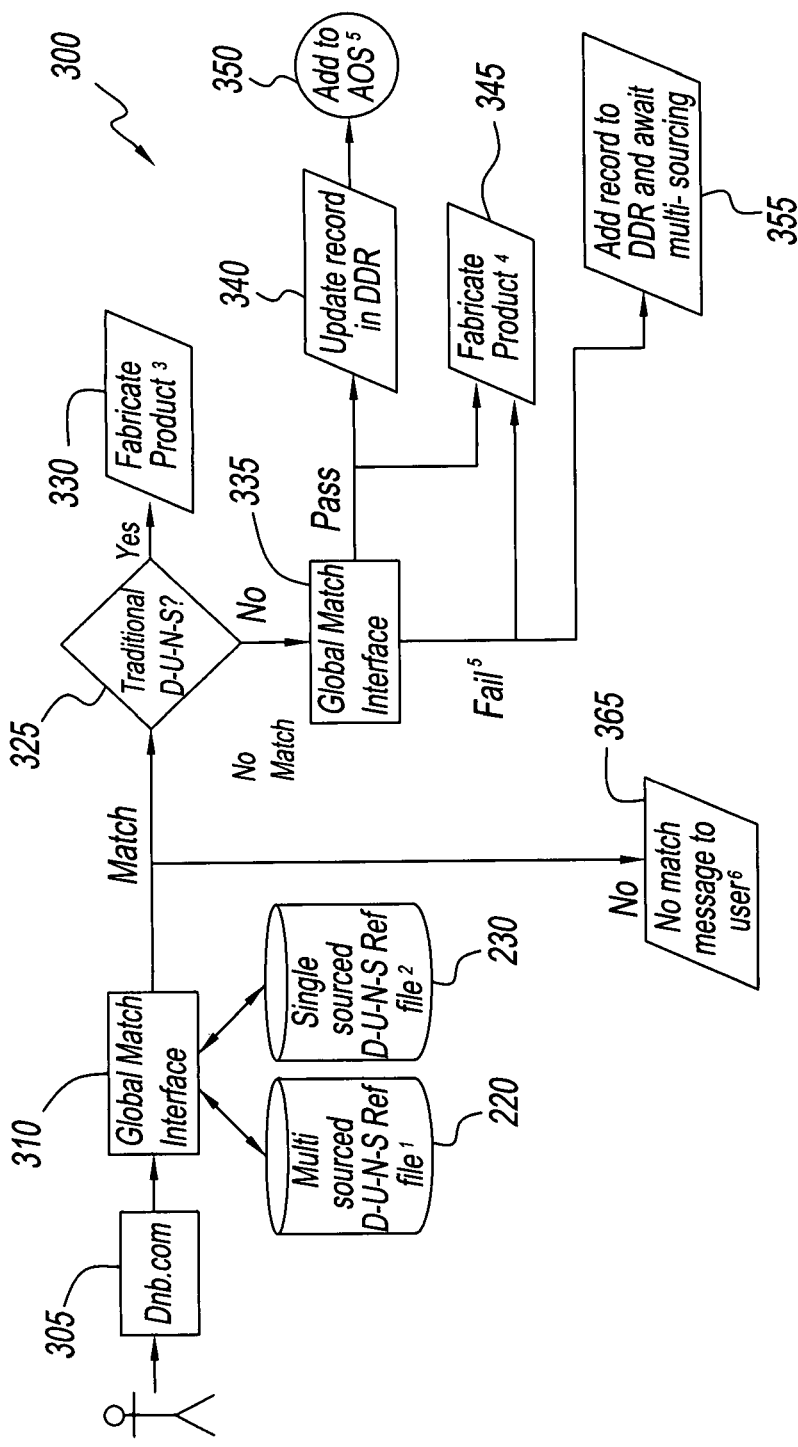
FIG. 3 depicts a customer inquiry flow diagram of the system of the present disclosure.

Referring to FIG. 3, a method 300 of enhancing matching of database queries and fabricating a product based on the database inquiries is shown. Method 300 includes a receiving data from a data source at data receiving step 305. In one preferred embodiment, data is received from a user via a web interface. After receiving the data, method 300 performs a global matching step 310, wherein the data is compared to one or more multi-sourced reference files in database 220 and one or more single-sourced reference files in data repository 230. If method 300 determines that the data does not match any of reference files of database 220 or data repository 230 at global matching step 310, method 300 sends a message to a user at step 365 indicating that no match for the data has been found.

However, if method 300 determines that the data matches one or more of reference files of database 220 or data repository 230, method 300 performs a first checking step 325. At first checking step 325, method 300 determines if the matching data includes the traditional unique business identifier. If the matching data does include the traditional unique business identifier, a product is fabricated based on the matching data at first product fabrication step 330.

If method 300 determines that the matching data does not include a traditional unique business identifier, method 300 performs a multi-sourcing determination step 335. Multi-sourcing step 335 determines whether the data qualifies as a verifying data source to enable a single-sourced reference file to be reclassified as a multi-sourced reference file. Multi-sourcing step 335 makes this determination based on predefined rules. If, according to the predefined rules, the data qualifies as a verifying data source, method 300 performs an updating step 340, wherein the second record is reclassified from a single-sourced reference to a multi-sourced reference and is added to database 220 at step 350, and a product is fabricated based on the matching data at a second product fabrication step 345. If, however, the data does not qualify as a verifying data source, method 300 still fabricates a product at second product fabrication step 345, but the matching data is added to data repository 230 at step 355.

The matching service includes the single sourced D-U-N-S numbers from the single-sourced data repository in order to provide an insightful answer to customers. If the returned record is a single source record then that D-U-N-S Number will be classified as a multi-sourced record and made available to all customers. The detailed process flow is as follows:
1. The incoming customer inquiries are matched against the multi-sourced (ACS including historical and EHA/DDM based match reference files) and single-sourced D-U-N-S and return the best match to the customer. If a match is found
    a. From the multi-sourced repository (AOS), fabricate and return the product from AOS to the customer.
    b. From the single-sourced repository (DDR), fabricate and return the product from DDR to the customer. If the match passes the multi-sourcing rules, update the record in DDR and upload to AOS. If not, leave it in DDR for future multi-sourcing.
2. If the match is not found in the internal repositories, match against the non-external business data sources.
    a. If a match is found, pass it through the D-U-N-S numbering rules to create a D-U-N-S number and add it to DDR. The record will be stored in DDR for future multi-sourcing. Then, fabricate and return a product to the customer.
    b. If a match is not found, pass it through the D-U-N-S numbering rules to create a single source D-U-N-S number and add it to the DDR with the appropriate indicators and return the D-U-N-S number as a product with a message to the user that no evidence of the existence of this entity as a business or consumer was found.

Figure 4:
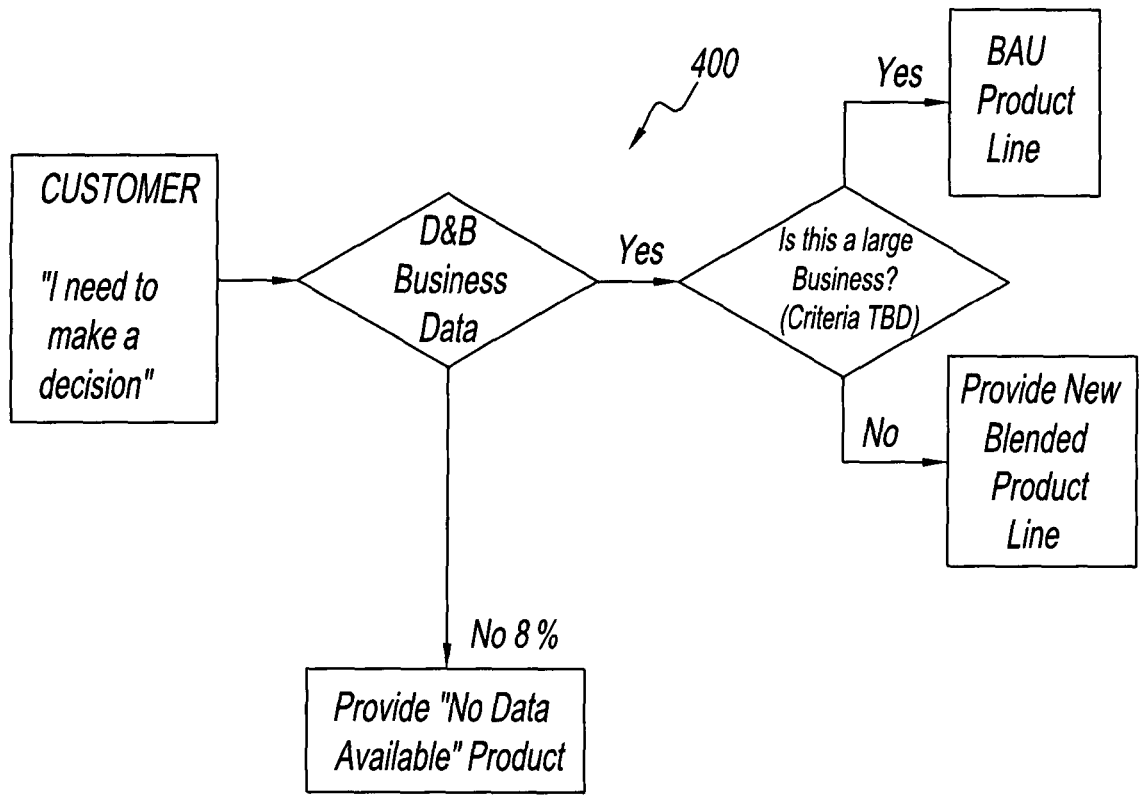
FIG. 4 is a product decision tree diagram of the system of the present disclosure.

FIG. 4 shows an alternate method 400 of enhancing matching of database queries received from a customer.

Figure 5:
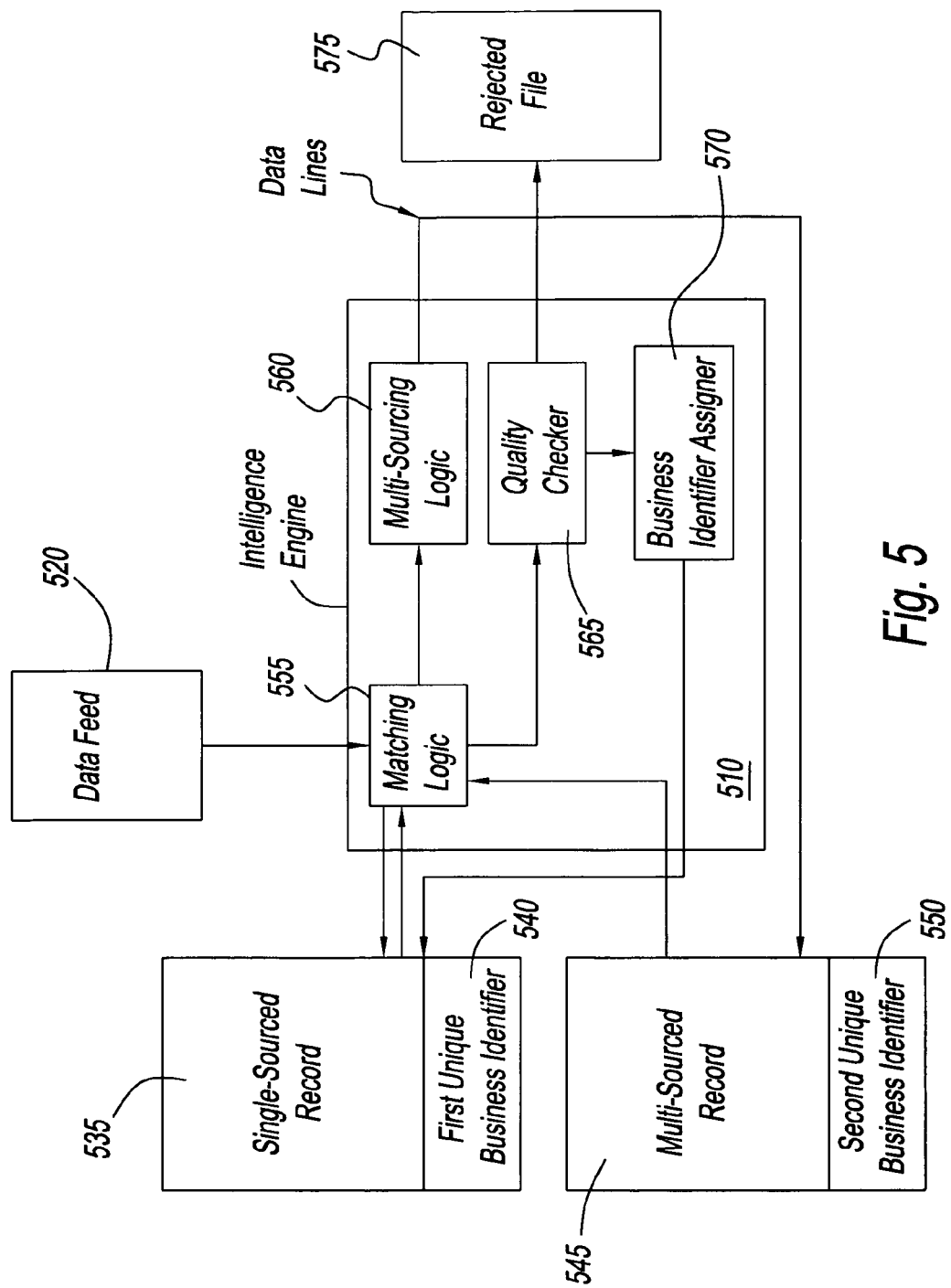
FIG. 5 is a block diagram of the system of the present invention depicting a rejected query.
Figure 6:
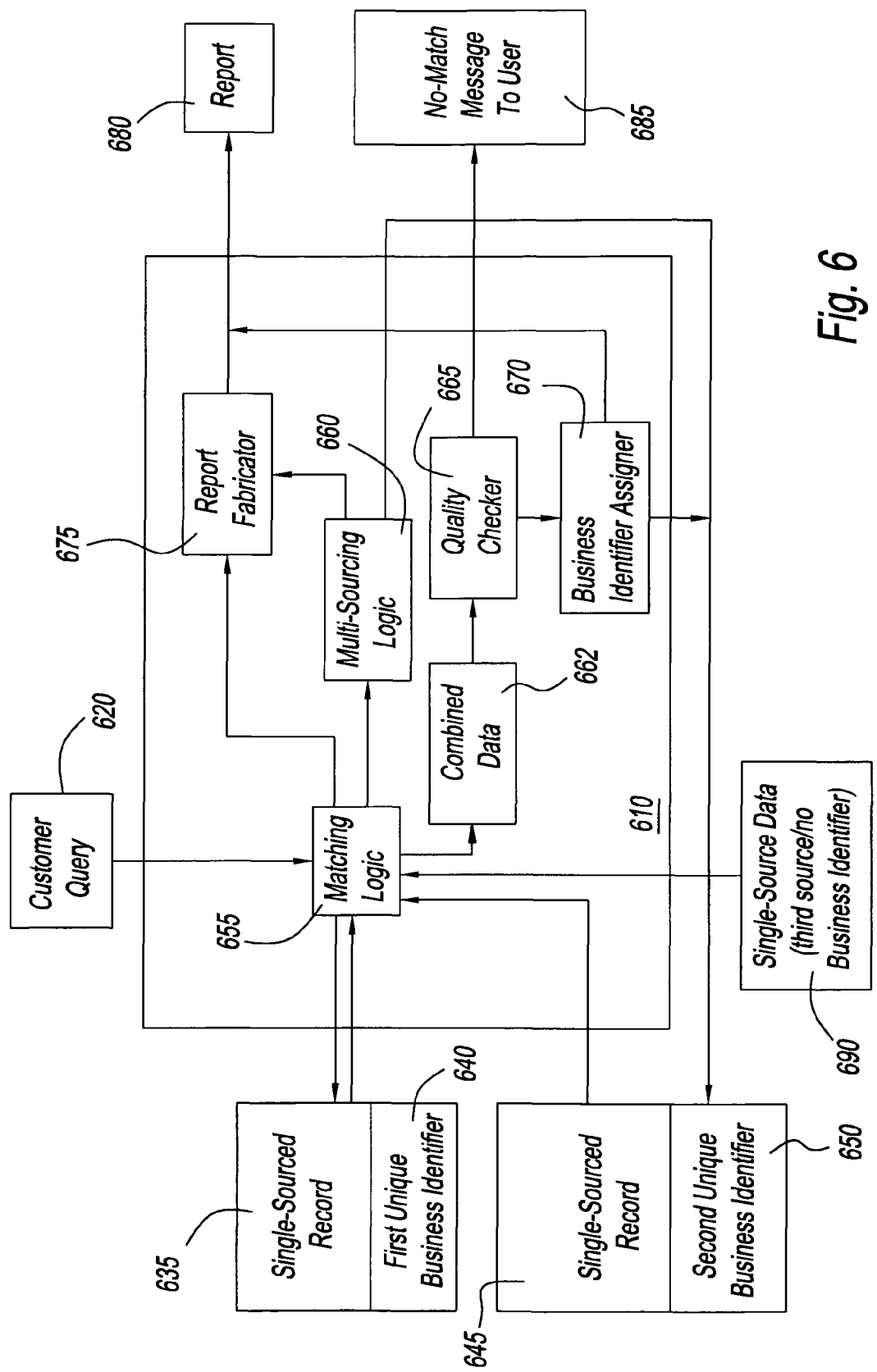
FIG. 6 is a block diagram of the system of the present disclosure depicting a successful report and a no-match report.

FIGS. 5 and 6 illustrate different data flow paths for the intelligence engine. Referring now to FIG. 5, an intelligence engine 510 for receiving a data feed 520, is shown. Intelligence engine 510 includes a matching logic 555 for comparing the data feed 520 to a first record 535 and a second record 545. The first record 535 comprises: (i) a first unique business identifier 540 indicating that the first record correlates to a first business entity described by the first record, and (ii) a source identifier indicating that the record comprises data from a single data source. The second record 545, comprising: (i) a second unique business identifier 550 indicating that the second record correlates to a second business entity described by the second record, and (ii) a source identifier indicating that the second record comprises data from two or more data sources.

The matching logic 555 determines if the data feed 520 correlates to either the first business entity or the second business entity. If data feed 520 correlates to the second business entity, a multi-sourcing logic 560 combines data feed 520 with the second record 545. If data feed 520 does not correlate to either of the first business entity or the second business entity, a quality checker 565 performs a quality check on data feed 520. If data feed 520 passes the quality check, a business identifier assigner 570 assigns a unique business identifier and creates a new single-sourced record. The system shown in FIG. 5 also includes a path from quality checker 565 to a rejected file 575.

Referring now to FIG. 6, an intelligence engine 610 for running a customer query 620 is shown. Intelligence engine 610 includes a matching logic 655 for comparing the customer query 620 to: a first record 635 having (i) a first unique business identifier 640 indicating that the first record 635 correlates to a first business entity described by the first record 635, and (ii) a source identifier indicating that the record comprises data from a single data source; a second record 645 having (i) a second unique business identifier 650 indicating that the second record 645 correlates to a second business entity described by the second record 645 and (ii) a source identifier indicating that the second record 645 comprises data from two or more data sources; and a third source 690 having data from one or more selected external business reference files.

Matching logic 655 determines if customer query 620 correlates to either the first business entity, the second business entity or to the third source 690 from the one or more selected external business files. In one preferred embodiment, intelligence engine 610 includes a multi-sourcing logic 660 for combining customer query 620 with second record 645 if customer query 620 correlates to the second business entity. A report fabricator 675 issues a report 680.

In another preferred embodiment, if matching logic 655 determines that customer query 620 correlates to third source 690, intelligence engine 610 combines customer query 620 with third source 690 to generate a combined data file 662. Intelligence engine 610 preferably includes a quality checker 665 for checking the combined data file 662. If quality checker 665 concludes that combined data file 662 is of an adequate quality, a business identifier assigner 670 assigns a unique business identifier and combined data file 662 is stored as a single-source record. Quality checker 665 may also issue a no-match message 685 to the user.

Figure 7:
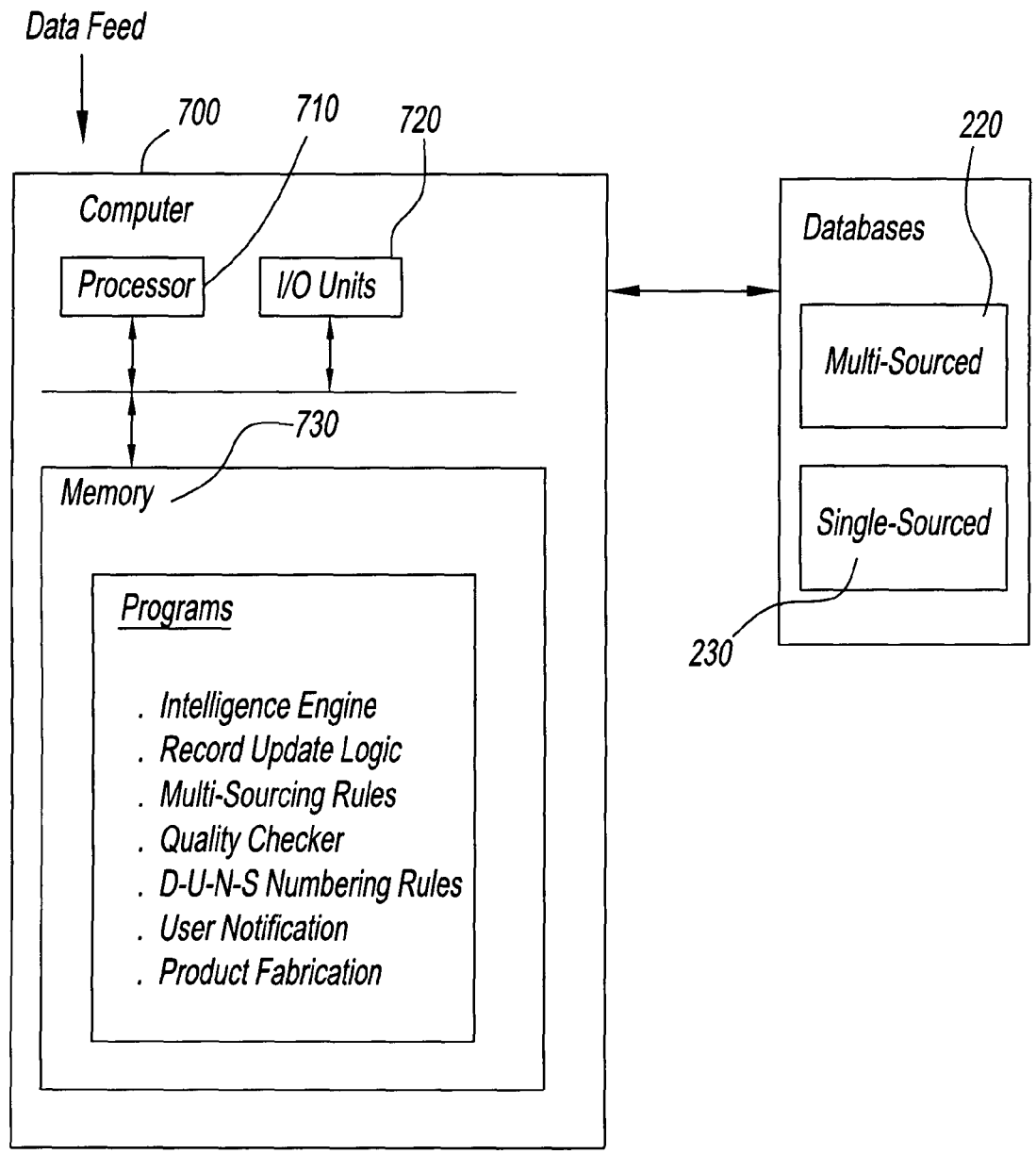
FIG. 7 is a block diagram of the system of the present disclosure.

FIG. 7 depicts the system of the present invention in which the data feed is received via an I/O unit of a computer 700. The computer comprises a processor 710, one or more I/O units 720 and a memory 730 interconnected by a bus. The memory comprises programs that embody the logic flows of FIGS. 2-6. The computer is interconnected with databases 220 and 230. Although shown as a single computer, the computer alternatively may be a plurality of computers that cooperate in performing the process flows of FIGS. 2-6.

The invention having been described with particular reference to the preferred embodiment thereof, it will be obvious to one having ordinary skill in the art that various changes and modifications may be made therein without departing from the scope of the invention as defined in the appended claims.

What is claimed is:

1. A system for providing enhanced matching for database queries, the system comprising:
   a data source;
   a first database having a first multi-sourced reference file, wherein the first multi-sourced reference file has been verified by a plurality of sources and is identified by a first unique business identification number corresponding to a business entity;
   a second database having a first single-sourced reference file that has not been verified by a plurality of sources;
   a processor; and
   a memory that contains programs that cause said processor to perform an action of an intelligence engine that:
   processes data from said data source;
   executes a first matching operation on said first multi-sourced reference file, wherein said intelligence engine determines whether said data matches said first multi-sourced reference file, and wherein said intelligence engine adds said data to said first multi-sourced reference file when said data matches said first multi-sourced reference file;
   executes a second matching operation on said first single-sourced reference file, when said first matching operation determines that said data does not match said first multi-sourced reference file, wherein said intelligence engine determines whether said data matches said first single-sourced reference file;
   determines whether said data qualifies as a verifying data source when said data does not match said first multi-sourced reference file and does match said first single-sourced reference file;
   creates a second multi-sourced reference file by adding said data to said first single-sourced reference file, and moves said second multi-sourced reference file from said second database to said first database when said intelligence engine determines that said data qualifies as said verifying data source; and
   creates a second single-sourced reference file using said data when said intelligence engine determines that said data does not qualify as a verifying data source.

2. The system of claim 1, further comprising:
   a quality checker residing in said intelligence engine, said quality checker checking the quality of said data before said intelligence engine creates said second single-sourced reference file;
   a business identifier assigner residing in said intelligence engine, said business identifier assigner assigning a second unique business identification number to said data when said quality checker determines that said data meets predetermined quality criteria; and
   a reject file, said reject file receiving said data when said quality checker determines that said data does not meet said predetermined quality criteria.

3. The system of claim 2, wherein said business identifier assigner reassigns said second unique business identification number to a third single-sourced reference file when said second single-sourced reference file has not been reclassified as a multi-source reference file after a predetermined length of time.

4. The system of claim 2, further comprising a fabricator, said fabricator producing a business data report from said first single-sourced reference file and from said first multi-sourced reference file.

5. The system of claim 1, further comprising a data cleaner residing in said intelligence engine, said data cleaner removing duplicate data from said first multi-sourced reference file and from said single-sourced reference file.

6. The system of claim 1, wherein said data source comprises a user-generated query.

7. A computer-readable medium storing instructions for causing a processor to perform actions of an intelligence engine that:

receives data from a data source;

executes a first matching operation on a first multi-sourced reference file in a first database, wherein said first multi-sourced reference file has been verified by a plurality of sources and is identified by a first unique business identification number corresponding to a business entity, wherein said intelligence engine determines whether said data matches said first multi-sourced reference file, and wherein said intelligence engine adds said data to said first multi-sourced reference file when said data matches said first multi-sourced reference file;

executes a second matching operation on a first single-sourced reference file in a second database when said first matching operation determines that said data does not match said first multi-sourced reference file, wherein said first single-sourced reference file has not been verified by a plurality of sources, and wherein said intelligence engine determines whether said data matches said first single-sourced reference file;

determines whether said data qualifies as a verifying data source when said data does not match said first multi-sourced reference file and does match said first single-sourced reference file;

creates a second multi-sourced reference file by adding said data to said first single-sourced reference file, and moves said second multi-sourced reference file from said second database to said first database when said intelligence engine determines that said data qualifies as said verifying data source; and creates a second single-sourced reference file using said data when said intelligence engine determines that said data does not qualify as a verifying data source.

8. The computer-readable medium of claim 7, further comprising:

instructions for checking a quality of said data based on predetermined quality criteria prior to creating said second single-sourced reference file;

instructions for, after creating a second single-sourced reference file, assigning a second unique business identification number to said second single-sourced reference file when said data meets said predetermined quality criteria; and instructions for sending said data to a reject file when said data fails to meet said predetermined quality criteria.

9. The computer-readable medium of claim 8, further comprising:

instructions for reassigning said second unique business identification number to a third single-sourced reference file when said second single-sourced reference file has not been reclassified as a multi-source reference file after a predetermined length of time.

* * * * *